(12) United States Patent
Nakajima et al.

(10) Patent No.: US 9,641,427 B2
(45) Date of Patent: May 2, 2017

(54) TRANSMISSION DEVICE AND PAUSE FRAME CONVERSION METHOD

(71) Applicants: Fujitsu Telecom Networks Limited, Kawasaki-shi (JP); FUJITSU LIMITED, Kawasaki-shi (JP)

(72) Inventors: Takashi Nakajima, Kawasaki (JP); Akio Yokotsuka, Kawasaki (JP); Hiroyuki Komori, Kawasaki (JP); Yukio Suda, Kawasaka (JP)

(73) Assignee: FUJITSU LIMITED, Kawasaki (JP)

( * ) Notice: Subject to any disclaimer, the term of this patent is extended or adjusted under 35 U.S.C. 154(b) by 134 days.

(21) Appl. No.: 14/636,044

(22) Filed: Mar. 2, 2015

(65) Prior Publication Data

US 2015/0271085 A1 Sep. 24, 2015

(30) Foreign Application Priority Data

Mar. 20, 2014 (JP) ................. 2014-058476

(51) Int. Cl.
*H04L 1/00* (2006.01)
*H04L 12/721* (2013.01)

(52) U.S. Cl.
CPC .................... *H04L 45/14* (2013.01)

(58) Field of Classification Search
CPC ..... H04W 36/08; H04W 36/12; H04W 36/14; H04W 36/18; H04W 36/30; H04W 36/0055; H04W 28/02; H04W 28/0205; H04W 28/021; H04W 28/0247; H04W 28/02852; H04W 28/0257; H04W 28/0263; H04W 28/0268; H04W 28/0273; H04L 47/10; H04B 7/02
USPC ........ 370/235, 329, 389, 464, 465, 466, 467
See application file for complete search history.

(56) References Cited

U.S. PATENT DOCUMENTS

2011/0305217 A1* 12/2011 Seok ................. H04L 47/10
 370/329
2013/0208595 A1* 8/2013 Connolly ............ H04L 47/266
 370/235

FOREIGN PATENT DOCUMENTS

JP 2003-169072 6/2003

* cited by examiner

*Primary Examiner* — Dady Chery
(74) *Attorney, Agent, or Firm* — Staas & Halsey LLP

(57) ABSTRACT

A client interface unit receives a pause frame transmitted from a client device compatible with a relatively low communication rate. A data rate conversion unit generates a plurality of pause frames in accordance with a pause time designated by the received one pause frame and transmits the plurality of pause frames to a frame processing unit compatible with a relatively high communication rate. The frame processing unit stops transmitting a frame destined to the client device in accordance with the plurality of pause frames.

4 Claims, 17 Drawing Sheets

FIG.2

| PAUSE TIME VALUE (QUANTA VALUE) | PAUSE TIME REQUESTED BY CLIENT DEVICE (10Mbps) | ACTUAL TIME OF PAUSE (100Mbps) |
|---|---|---|
| 0x0001 | 51.2us | 5.12us |
| ~ | ~ | ~ |
| 0xFFFF | 3,355,392us | 335,539.2us |

FIG.3

| PAUSE TIME VALUE (QUANTA VALUE) | PAUSE TIME REQUESTED BY CLIENT DEVICE (10Mbps) | PAUSE TIME VALUE AS CONVERTED | ACTUAL TIME OF PAUSE (100Mbps) |
|---|---|---|---|
| 0x0001 | 51.2us | 0x000A | 51.2us |
| ~ | ~ | ~ | ~ |
| 0xFFFF | 3,355,392us | 0x9FFF6 | 3,355,392us |

TRANSMISSION DEVICE AND PAUSE FRAME CONVERSION METHOD

CROSS-REFERENCE TO RELATED APPLICATIONS

This application claims priority to Japanese Patent Application No. 2014-058476 filed on Mar. 20, 2014, the disclosure of which is hereby incorporated by reference in its entirety.

BACKGROUND OF THE INVENTION

1. Field of the Invention

The present invention relates to data communication technology and, more particularly, a data transmission device and a pause frame conversion method.

2. Description of the Related Art

In association with the expansion of the smartphone market, etc., an increasing number of data transmission devices are being built. It is imperative to increase the level of integration of interface circuits in transmission devices, lower the cost of the circuits, and reduce the time required for delivery of the design. Products from device vendors and interface units built of control and monitor circuits, etc. can be combined to reduce the time required for development of transmission devices.

Unlike the case of using custom-designed devices, use of general-purpose devices provided by devices vendors inherently requires certain compromise in device specification, addition or adjustment of functionality using external circuits, etc. Use of general-purpose devices provided by device vendors has become a standard means for designing transmission devices because it involves a lower risk and FPGAs used for control and monitor have become more and more convenient to use recently.

In this background, it has become important how to address a difference between the specification required of a transmission device and the specification of general-purpose devices built in the transmission device. Normally, device vendors aim to provide general-purpose devices suited to major needs on the market and to remove old functionalities and interfaces from the perspective of, for example, reduction of cost. In contrast, developers of transmission devices need to develop devices by allowing for requirements from clients (e.g., communication carriers) who would like old functionalities and interfaces to continue.

The rate of Ethernet transmission devices ("Ethernet" is a registered trademark) has increased from 10 Mbps to 10 Gbps/100 Gbps, but some clients request that the device be compatible with 10 Mbps (10 BASE-T). Recently, however, some device vendors remove the capabilities for 10 BASE-T from the specification of general-purpose devices, requiring the developer of a transmission device to implement functionalities for compatibility with 10 BASE-T.

It should be noted that a pause frame for flow control is defined in IEEE802.3. A pause frame is a MAC frame that tells the source of transmission (e.g., an opposing device in communication) to stop transmitting packets temporarily when the packet storage memory in a communication device is full or the free memory space falls below a threshold level. As shown in FIG. 1 a pause frame is comprised of 64 octets. The requested time of pause of packet transmission is contained in a field for pause time located in the 17th and 18th octets from the start of the pause frame. Because the field size for pause time is 2 octets, any value from 0-65535 can be designated as a pause time value (hereinafter, also referred to as "quanta value") (see, for example, patent document 1).

[Patent Document 1] JP2003-169072

It will now be assumed that the processing unit for controlling transmission or pause of transmission of frames in a transmission device is built by general-purpose devices compatible with 100 Mbps communication but the client device opposing the transmission device is compatible with 10 Mbps communication. It is assumed that the client device detects that its memory is full and transmits a pause frame to the transmission device. A quanta, which is a unit of pause time designated by a pause frame, specifies the time required to send 512 bits. In other words, a quanta in the case of 10 Mbps specifies 51.2 µs, and a quanta in the case of 100 Mbps specifies 5.12 µs. Therefore, if a pause frame transmitted from the client device is delivered to the general-purpose device without converting its quanta value, a difference is created between the pause time requested by the client device and the time for which the transmission device actually stops transmitting packets (FIG. 2).

This may be addressed by converting the quanta value of a pause frame transmitted from the client device before delivering the frame to the general-purpose device. For example, when a pause frame is received from the client device, the quanta value designated by the pause frame is multiplied by 10 so that a pause frame designating a quanta value 10 times the original value is transferred to the general-purpose device. This can match the pause time requested by the client device with the time for which the transmission device actually stops transmitting packets (FIG. 3).

SUMMARY OF THE INVENTION

However, the field size reserved in a pause frame to designate a quanta value is 2 octets, as mentioned above. For this reason, if the client device designates a quanta value of "6554" or higher, the quanta value 10 times the original value (e.g., "65540") cannot be transferred to the general-purpose device directly. We have become aware of a need for a scheme that matches pause time values between devices that exchange a pause frame in the presence of restriction imposed on the field size for designating the pause time in a pause frame.

The present invention is based on the above awareness and a general purpose thereof is to provide a technology for matching the pause time requested by one of devices with different communication rates using a pause frame, with the time for which the other device stops transmitting frames.

The transmission device that addresses the aforementioned challenge comprises: an interface unit connected to a client device compatible with a relatively low communication rate; a frame processing unit that is compatible with a relatively high communication rate and processes a frame transmitted from the client device; and a routing unit that routes a frame between the interface unit and the frame processing unit. The interface unit receives a pause frame received from the client device, the routing unit generates a plurality of pause frames in accordance with a pause time designated by one pause frame received by the interface unit, and transmits the plurality of generated pause frames to the frame processing unit, and the frame processing unit stops transmitting frames to the client device in accordance with the plurality of pause frames transmitted from the routing unit.

Another embodiment of the present invention relates to a pause frame conversion method. The method comprises: acquiring a pause frame transmitted from a client device compatible with a relatively low communication rate; generating a plurality of pause frames in accordance with a pause time designated by one pause frame transmitted from the client device; and transmitting the plurality of pause frames to a frame processing unit that is compatible with a relatively high communication rate and that processes a frame transmitted from the client device, thereby causing the frame processing unit to stop transmitting a frame to the client device in accordance with the plurality of pause frames.

Optional combinations of the aforementioned constituting elements, and implementations of the invention in the form of systems, programs, and recording mediums storing programs may also be practiced as additional modes of the present invention.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which:

FIG. 2 lists periods of time for which transmission is stopped when the pause time in the pause frame is not converted;

FIG. 3 lists periods of time for which transmission is stopped when the pause time in the pause frame is converted;

DETAILED DESCRIPTION OF THE INVENTION

The invention will now be described by reference to the preferred embodiments. This does not intend to limit the scope of the present invention, but to exemplify the invention.

Figure 4:
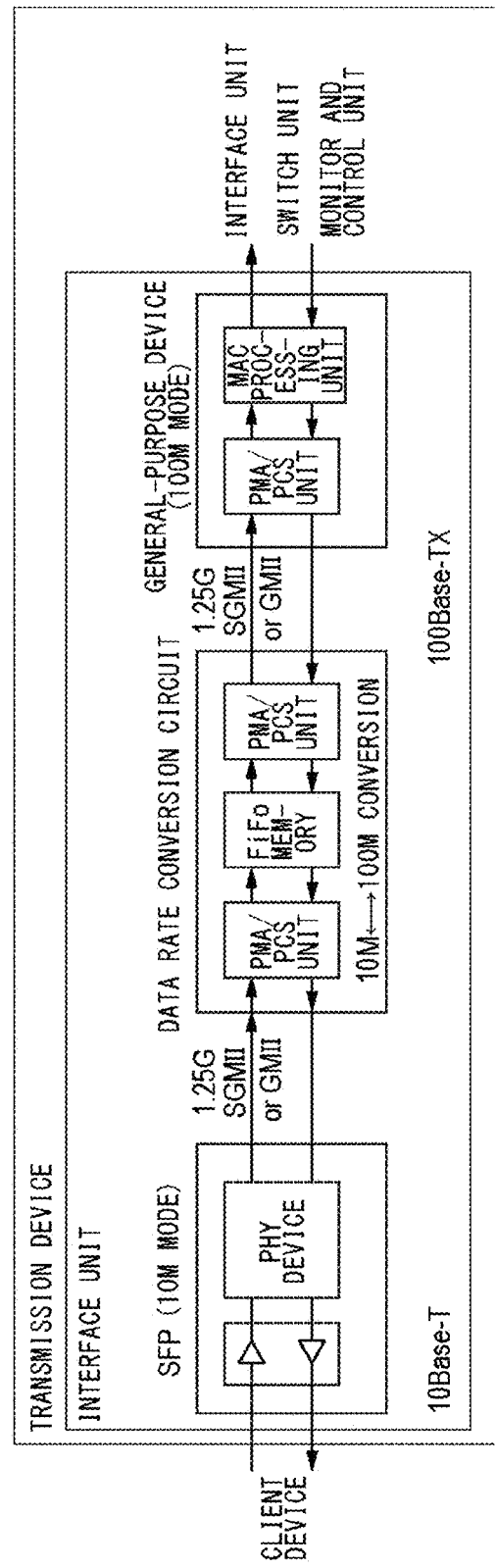
FIG. 4 shows an exemplary configuration of a transmission device.

As already described, if a general-purpose device provided by a device vendor fails to meet the specification required of a transmission device in which the general-purpose device is built, the developers of the transmission device is required to implement the functionality to meet the required specification. FIG. 4 shows an exemplary configuration of a transmission device. The transmission device as illustrated includes a plurality of devices such as an interface unit, a switch unit, a monitor and control unit, etc.

The general-purpose device of FIG. 4 processes MAC frames transmitted from a client device. The general-purpose device is provided with an interface for 100 Mbps communication (Fast Ethernet) but is not provided with an interface for 10 Mbps communication. Meanwhile, the client device is provided with an interface for 10 Mbps communication but is not provided with an interface for 100 Mbps communication. It is therefore necessary to provide the transmission device with a data rate conversion circuit for canceling the difference between interface rates. In the example of FIG. 4, Ethernet data rate conversion is achieved based on a standard for mapping 10 BASE-T and 100 BASE-TX to the Serial Gigabit Media Independent Interface (SGMII).

In FIG. 4, the client interface is assumed to be located on the left and the backward board is assumed to be located on the right. The backward board is also called a back wired board. The operation of the parts is as described below.

The Small Form factor Pluggable module (SFP) performs photoelectric conversion and electro-optic conversion. The data rate conversion circuit performs rate conversion between 10 BASE-T and 100 BASE-TX and mapping to SGMII (or GMII). The PMA/PCS unit provides an interface for SGMII (or GMII). More specifically, the Physical Medium Attachment (PMA) unit serialize data and the Physical Coding Sublayer (PCS) unit codes the data. The FiFo memory is for data conversion between 10 Mbps and 100 Mbps. In other words, the FiFo memory is a data storage memory for performing rate conversion.

The MAC processing unit terminates a MAC frame input from the client side and sends a packet to the respective units in the device via the backboard. The packet may be a MAC frame or a SONET frame or a frame of any of various modes adapted to the opposing devices in communication. The MAC processing unit maps the packet forwarded from the units within the device and destined to the client device to a MAC frame and sends the resultant frame to the client. The trend today in the standard processed by general-purpose devices is 100 BASE-TX or 1000 BASE-T. Many general-purpose devices are not provided with terminal circuits for 10 BASE-T.

Figure 5:
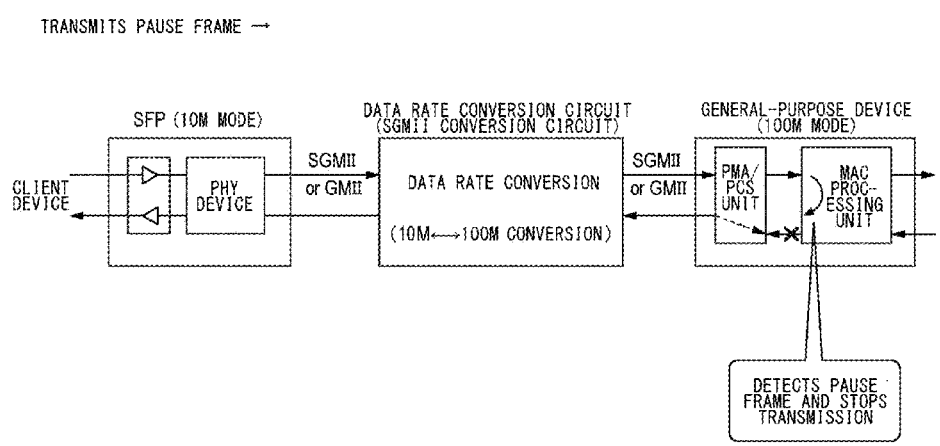
FIG. 5 schematically shows the operation performed when pause of transmission is requested by using a pause frame.

FIG. 5 schematically shows the operation performed when pause of transmission is requested by using a pause frame. When the MAC processing unit of a general-purpose device detects a pause frame transmitted from the client device, the MAC processing unit stops sending MAC frames to the client device for a duration of the pause time designated by the pause frame. For example, the MAC processing unit stores the transmission source address (i.e., the MAC address of the client device) defined in the pause frame and stops sending MAC frames designating the transmission source address as a destination. In the SGMII layer interface, 8 bytes for preamble/start frame delimiter are added at the start of the 64-octet pause frame shown in FIG. 1.

As shown in FIG. 4, the interface rate of the client interface differs from that of the general-purpose device. Therefore, if the quanta value in the pause frame transmitted from the client device is not converted, the time in which transmission of frames is actually stopped in the transmission device will be 1/10 that of the time requested by the client device, as shown in FIG. 2. If the quanta value requested by the client device is multiplied by 10 in order to address this issue, the quanta value 10 times the original value may not be transferred due to the restriction on the format of a pause frame.

In the transmission device according to an embodiment (data rate conversion unit 16 described later), the quanta value of one pause frame received from the client device is multiplied by 10. If the quanta value 10 times the original exceeds the upper limit of quanta value that can be defined in a pause frame, a plurality of pause frames to which fractions of the quanta value 10 times the original value are assigned are generated. The plurality of pause frames are transmitted to the general-purpose device.

According to this configuration, even if the general-purpose device (e.g., frame processing unit 18 described later) built in the transmission device is not compatible with 10 BASE-T, transmission can be paused for a duration of the pause time designated by the pause frame interfaced by 10 BASE-T. In other words, the pause time requested by the client device of a low communication rate can be matched to the time for which the transmission device of a high communication rate actually stops transmitting packets. Because there is no need for the developer of the transmission device to modify the general-purpose device itself, the developer can enjoy benefits from using general-purpose devices, such as maintenance of reliability, reduction of cost, and reduction delivery time. Further, because the upper limit of quanta value is used as a reference of a transmission quanta value, the number of pause frames can be prevented from growing and pause of transmission can be processed efficiently.

When a plurality of pause frames are generated from a single pause frame received from the client device and the plurality of pause frames are transmitted to the general-purpose device, the following problem arises. In other words, the transmission of at least one of a plurality of pause frames to the general-purpose device may concur with the transmission, to the general-purpose device, of a frame other than a pause frame received from the client device after the pause frame is received. In the event of concurrence, the pause frame cannot necessarily be transmitted on a priority basis. If the transmission of pause frames is interrupted, i.e., if the succeeding pause frame cannot be transmitted while transmission is stopped by the pause frame previously transmitted, the state of pause of transmission of the general-purpose device will be terminated. Therefore, some scheme for not interrupting the request for pause of transmission using a pause frame should be necessary.

To address this issue, the transmission device according to the embodiment (data rate conversion unit 16 described later) transmits a plurality of pause frames to the general-purpose device such that transmission of the succeeding pause frame is completed while transmission is paused by the previous pause frame. For this purpose, the transmission device starts transmitting the succeeding pause frame at a point of time after the transmission of the previous pause frame and before the expiration of the pause time designated by the previous pause frame. In other words, the transmission device transmits the succeeding pause frame during an interval (hereinafter, also referred to as "guard interval") elapsed since a point of time before the expiration of the pause time designated by the previous pause frame until the expiration of the pause time. As described later the guard interval according to the embodiment is a period of time specified by 200 quanta, namely, 1024 µs.

According to this configuration, the guard interval is provided so that the plurality of pause frames generated are transmitted without interruption. This prevents termination of the state of pause of transmission during a time in which the state should be maintained and can achieve pause of transmission for a period of time requested by the client device.

The duration of the guard interval is defined to be equal to or longer than a period of time required to wait for the completion of a process of transmitting a frame of the maximum size that can be processed in the device and to complete the transmission of the succeeding pause frame. In other words, the guard interval is defined to be equal to longer than the total of the time required between the start and end of the transmission a frame of the maximum size and the time required between the start and end of the transmission of a 64-octet pause frame. The maximum size of a frame is 1500 octets in the case of an ordinary MAC frame and 9600 octets in the case of a jumbo frame. The value of the guard interval may be fixed or can be changed from an external management terminal. Alternatively, an appropriate value may be determined based on the knowledge of the developer of the transmission device, experiments using the transmission device, the mode of operating the transmission device, etc.

It should be noted, however, that, when the MAC processing unit of the general-purpose device, placed in the state of pause of transmission of frames in response to the previous pause frame, receives the succeeding pause frame, the MAC processing unit will be placed in the state of pause of transmission of frames in accordance with the pause time value designated by the succeeding pause frame. Thus, the fraction of the pause time value designated by the previous pause frame that remains when the succeeding pause frame is transmitted (hereinafter, also referred to as "remaining pause time") is not reflected in the pause time for which transmission of frames from the MAC processing unit is stopped.

Accordingly, the transmission device according to the embodiment (data rate conversion unit 16 described later) reflects the remaining pause time in the pause frame transmitted subsequent to the previous pause frame. In other words, the transmission device increases the pause time value in the subsequent pause frame by an amount equal to the fraction of the pause time value designated by the previous pause frame that does not actually result in pause of transmission of frames from the MAC processing unit. According to this configuration, transmission can be more properly paused for an amount of time requested by the client device.

A description will now be given of the principle of pause frame conversion according to the embodiment. In this embodiment, the transmission process is performed using the upper limit of quanta value as a reference. As described above, the upper limit of quanta value is "65535" ("0xFFFF" in the hexadecimal notation). The flow of the process is as described below.

(1) The quanta value of the pause frame received from the client device (hereinafter, also referred to as "received quanta value") is multiplied by 10 and stored as an untransmitted quanta value.

(2) Pause frames in which the upper limit of quanta value is designated are transmitted at regular intervals to the MAC processing unit, or, if the untransmitted quanta value is equal to or lower than the upper limit, a pause frame in which the untransmitted quanta value is designated is transmitted to the MAC processing unit. While frames, other than a pause frame, received subsequent to the reception of the pause frame from the client device are being processed, pause frames cannot be transmitted. Therefore, a pause frame is transmitted at a point of time within the guard interval and at a point of time at which the transmission of a pause frame is enabled.

(3) The quanta value transmitted to the MAC processing unit (hereinafter, referred to as "transmission quanta value") is subtracted from the untransmitted quanta value.

(4) Steps (2) and (3) above are repeated. When the untransmitted quanta value reaches 0, the process of transmitting pause frames is terminated.

Figure 6:
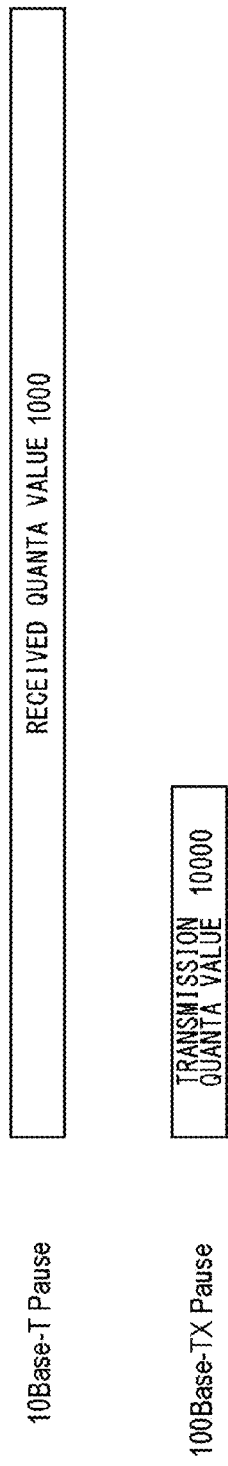
FIG. 6 shows the principle of pause frame conversion according to the embodiment.
Figure 7:
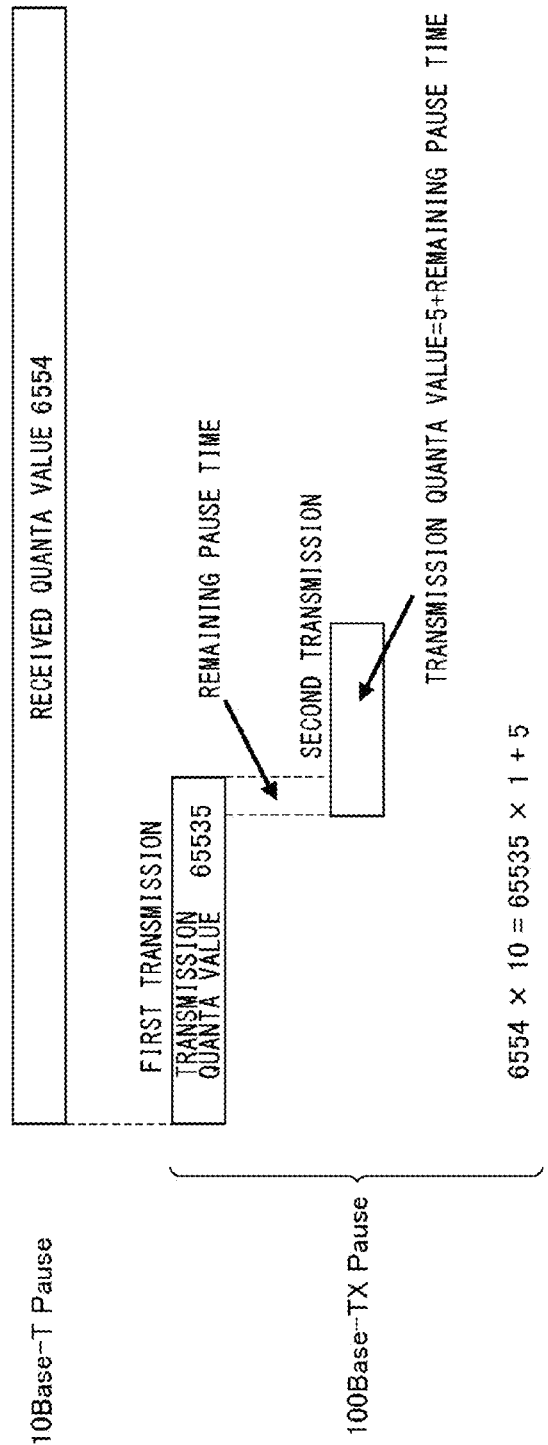
FIG. 7 shows the principle of pause frame conversion according to the embodiment.
Figure 8:
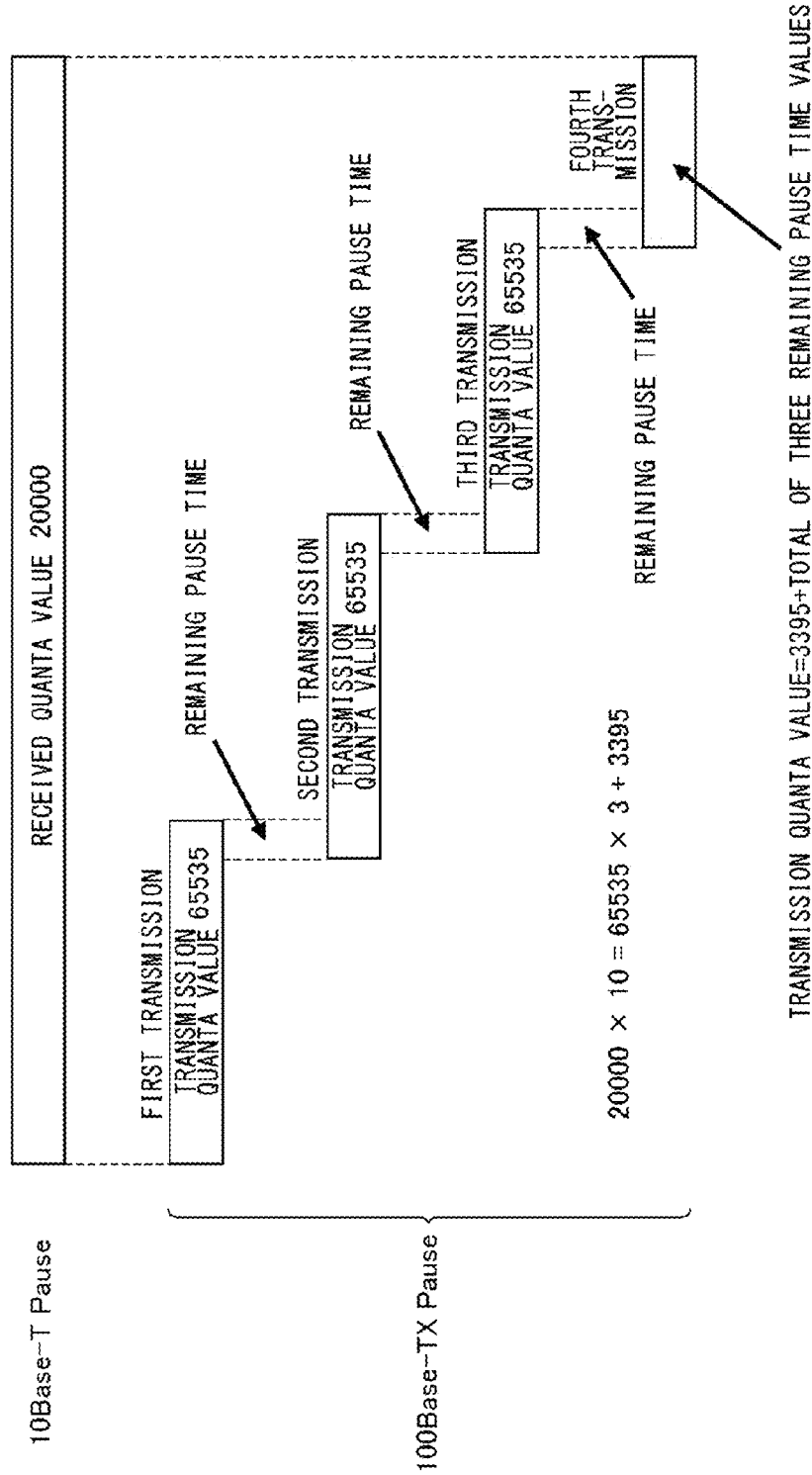
FIG. 8 shows the principle of pause frame conversion according to the embodiment.

FIGS. 6 through 8 show the principle of pause frame conversion according to the embodiment. As shown in FIG. 6, if the received quanta value is "1000", the tenfold value "10000" is lower than the upper limit of quanta value. Therefore, one pause frame in which the quanta value "10000" is designated is transmitted to the MAC processing unit.

As shown in FIG. 7, if the received quanta value is "6554", the tenfold value "65540" exceeds the upper limit of quanta value. In this case, the transmission quanta value of the first frame is "65535", and the remaining quanta value is transmitted by the second frame. The timing of transmission of the second frame is within the guard interval for the transmission quanta value of the first frame. The fraction of transmission quanta value of the first frame that remains when the second frame is transmitted is identified as the remaining pause time. The transmission quanta value of the second frame will be the total of "5" (=received quanta value×10-transmission quanta value of the first frame) and the remaining pause time.

As shown in FIG. 8, a pause frame is transmitted four times if the received quanta value is "20000". The transmission quanta value of the fourth and last frame is the total of "3395" (=received quanta value×10–total of transmission quanta values of first through third frames) and the total of the three remaining pause time.

Figure 9:
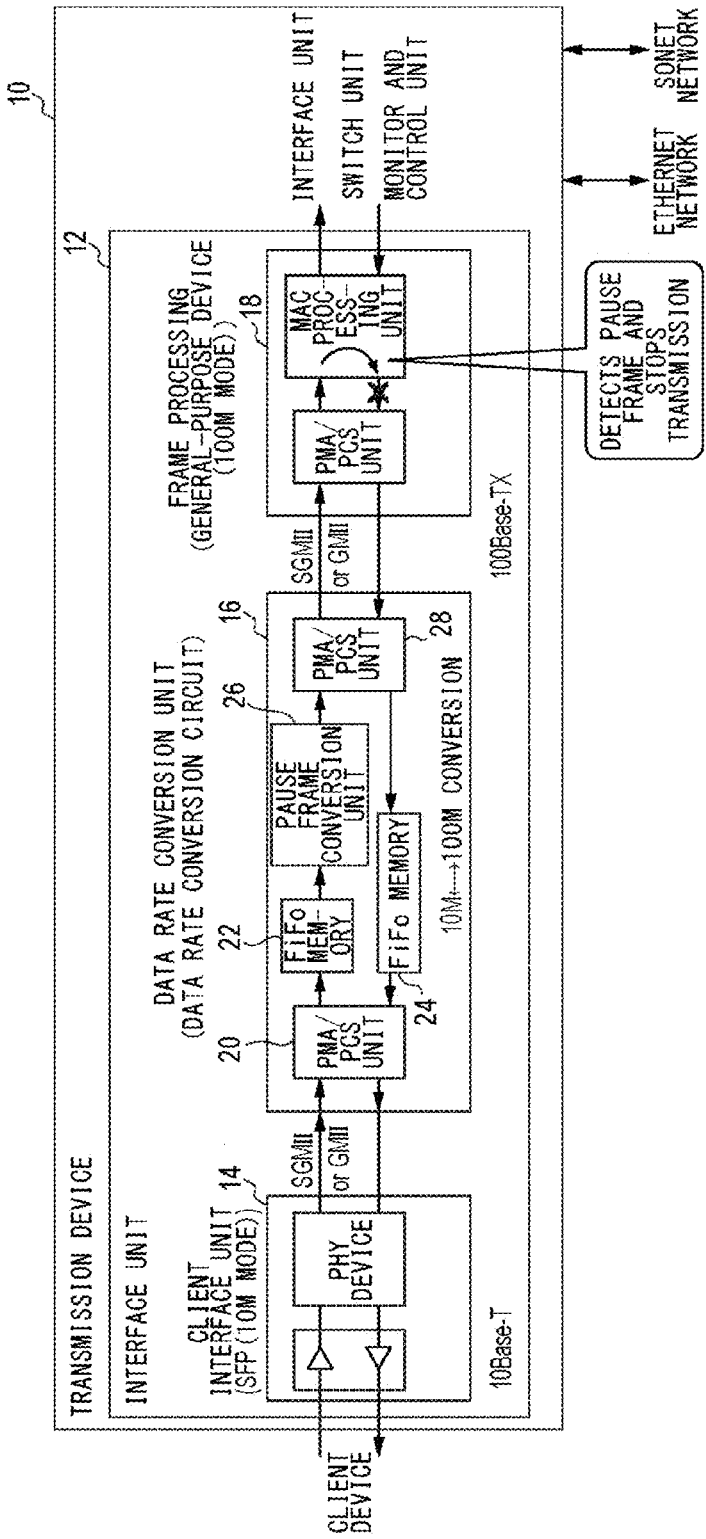
FIG. 9 shows the configuration of the transmission device according to the embodiment.

A description will now be given of a transmission device in which the pause frame conversion described above is implemented. FIG. 9 shows the configuration of the transmission device according to the embodiment. For example, a transmission device 10 may be a Layer-2 switch or a multi-layer communication device. The transmission device 10 includes an interface unit, a switch unit, and a monitor and control unit. An interface unit 12 is also called an interface card or an interface panel and includes a client interface unit 14, a data rate conversion unit 16, and a frame processing unit 18.

FIG. 9 is also a block diagram showing the functionality of the transmission device 10. The blocks depicted in the block diagram of this specification are implemented in hardware such as devices, mechanical devices, or electronic circuits such as a CPU and a memory of a computer, and in software such as a computer program etc. FIG. 9 depicts functional blocks implemented by the cooperation of these elements. Therefore, it will be obvious to those skilled in the art that the functional blocks may be implemented in a variety of manners by a combination of hardware and software. The same is true of FIGS. 10 and 11.

The client interface unit 14 corresponds to SPF of FIG. 4, the data rate conversion unit 16 corresponds to the data rate conversion circuit of FIG. 4, and the frame processing unit 18 corresponds to the general-purpose device of FIG. 4. The frame processing unit 18 processes communication and data based on received frames. When the MAC processing unit of the frame processing unit receives a pause frame in which the MAC address of the client device is designated as a transmission source address, the MAC processing unit stops transmitting frames to the client device for an amount of time designated by the quanta value in the pause frame. The details already described with reference to FIG. 4 are omitted below.

The client device is a communication device not compatible with the communication rate (100 Mbps) that the frame processing unit 18 is compatible with and only provided with an interface of lower rate (10 Mbps). For example, the client device may be a transmission device such as a Layer-2 switch or an information terminal such as a PC. The client device communicates with other terminals or servers via the transmission device 10.

The data rate conversion unit 16 routes MAC frames between the client interface unit 14 and the frame processing unit 18. In this process, the data rate conversion unit 16 converts the rate to cancel a difference in communication rate between the client interface unit 14 and the frame processing unit 18. The data rate conversion unit 16 includes a PMA/PCS unit 20, a FiFo memory 22, a FiFo memory 24, a pause frame conversion unit 26, and a PMA/PCS unit 28.

The PMA/PCS unit 20 and the PMA/PCS unit 28 correspond to the PMA/PCS units shown in FIG. 4 and provides an interface for SGMII. The FiFo memories 22 and 24 correspond to the FiFo memory shown in FIG. 4 and performs a publicly known rate conversion process.

As indicated in describing the principle pause rate conversion, the pause frame conversion unit 26 receiving one pause frame from the client device generates one or more pause frames from the received one pause frame and outputs the generated pause frames to the frame processing unit 18. The number of pause frames generated is determined by the following factors.

(1) The difference between the communication rates that the client device and the frame processing unit 18 are respectively compatible with.

(2) The quanta value designated by the received pause frame (pause time value).

It is assumed that the plurality of pause frames generated from the received one pause frame include the first pause frame and the second pause frame. In this case, after outputting the first pause frame to the frame processing unit, the pause frame conversion unit 26 outputs the second frame to the frame processing unit within the guard interval preceding the expiration of the pause time designated by the first pause frame. The pause frame conversion unit 26 reflects a fraction of the pause time designated by the first pause frame that remains when the second pause frame is transmitted, in the pause time designated in at least one pause frame output subsequent to the first pause frame.

Figure 10:
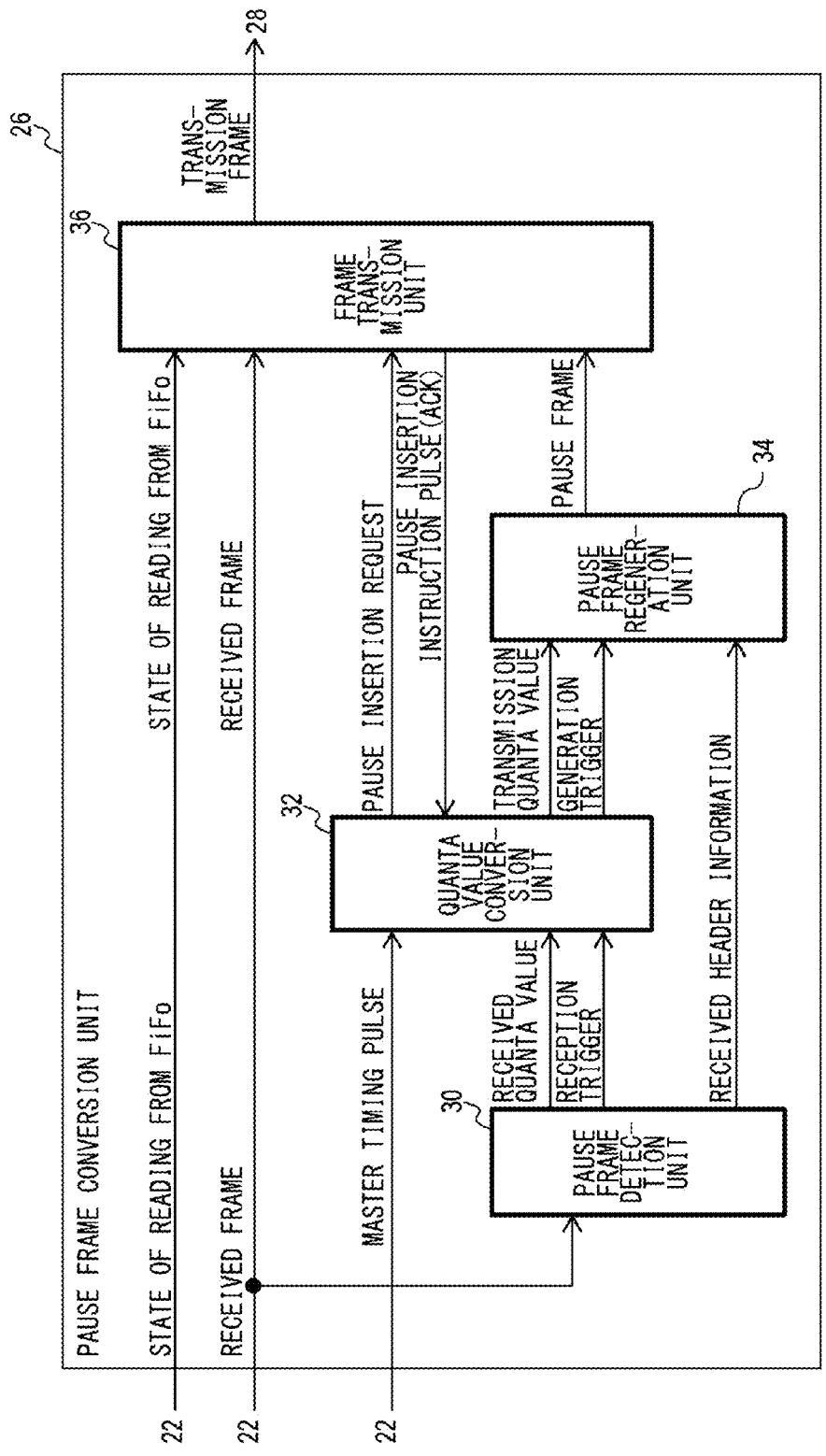
FIG. 10 shows the detailed configuration of the pause frame conversion unit of FIG. 9.

FIG. 10 shows the detailed configuration of the pause frame conversion unit of FIG. 9. The pause frame conversion unit 26 includes a pause frame detection unit 30, a quanta value conversion unit 32, a pause frame regeneration unit 34, and a frame transmission unit 36.

Figure 1:
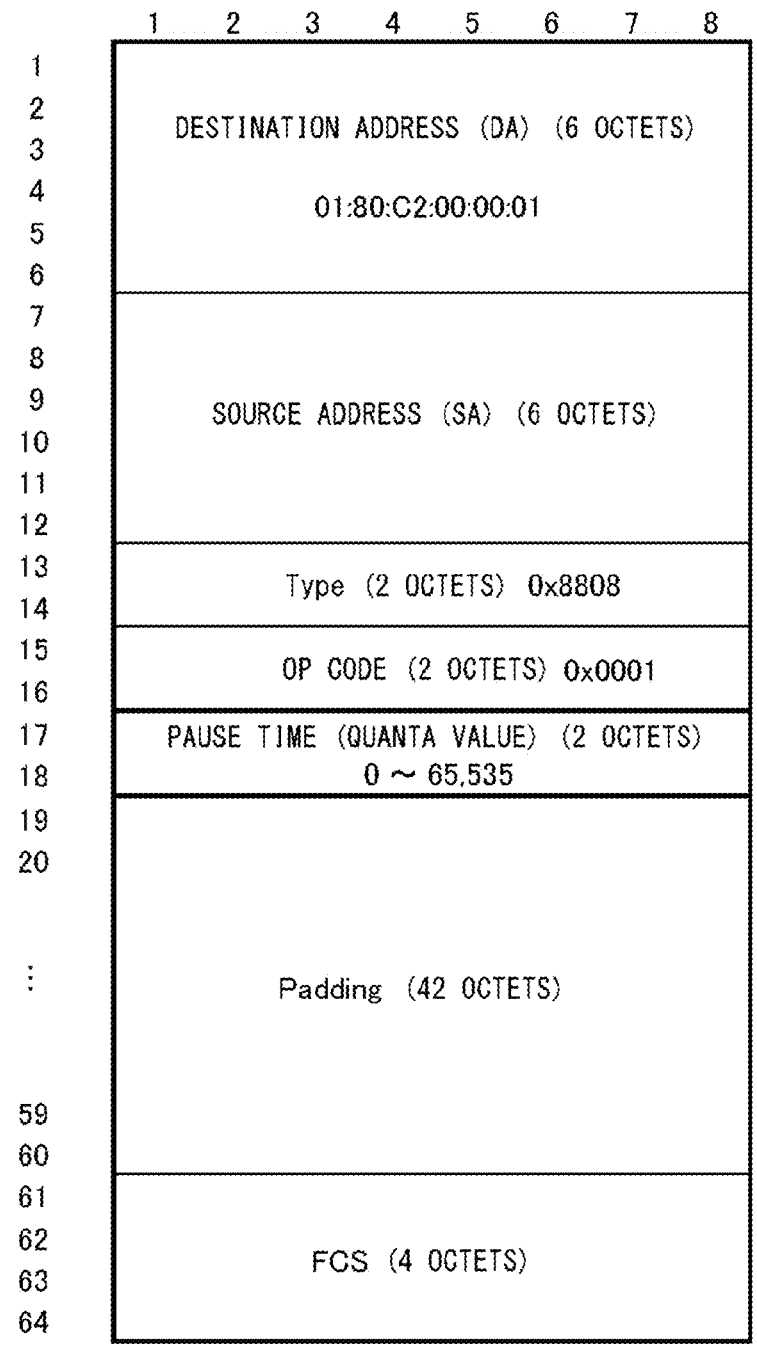
FIG. 1 shows the format of a pause frame.

The pause frame detection unit 30 acquires the received frame from the client device read in the FiFo memory 22 and identifies a pause frame in the received frame. For example, a pause frame may be identified by determining whether the values of the destination address and the op code of FIG. 1 are of predetermined values indicating a pause frame.

The pause frame detection unit 30 outputs, to the quanta value conversion unit 32, the quanta value defined in the pause frame and a predetermined pause frame identifier, as the received quanta value and a reception trigger, respectively. Further, the pause frame detection unit 30 outputs, as received header information, at least a portion of data for the received pause frame necessary for regeneration of a pause frame to the pause frame regeneration unit 34. The received header information may be the entirety of the pause frame or only the MAC header portion (e.g., data portion as far as the op code in the 16th octet).

The quanta value conversion unit 32 converts the received quanta value. The quanta value conversion unit 32 outputs a resultant (post-conversion) transmission quanta value and a pause frame generation trigger (pause frame regeneration instruction) to the pause frame regeneration unit 34. The quanta value conversion unit 32 operates by using master timing pulses at periods of 5.12 µs as a timing reference. In this embodiment, the readout controller (not shown) in the FiFo memory 22 generates the master timing. The master timing serves as a reference of operation of 100 BASE-TX that interfaces with the opposing device at the transmitting end. The master timing can also be said as the timing referenced in the interface with the frame processing unit 18. 5.12 µs is the reference time for 1 quanta according to the 100 BASE-TX interface of the embodiment.

When a generation trigger is received from the quanta value conversion unit 32, the pause frame regeneration unit 34 regenerates a pause frame based on the transmission quanta value received from the quanta value conversion unit 32 and the received header information received from the pause frame detection unit 30. The transmission quanta value received from the quanta value conversion unit 32 is defined in the regenerated pause frame. The pause frame regeneration unit 34 also re-calculates FCS.

The frame transmission unit 36 causes the pause frame read from the FiFo memory 22 to wait for the pause frame output from the pause frame regeneration unit 34 and outputs the latter pause frame to the PMA/PCS unit 28 as a frame for transmission (transmission frame). The frame transmission unit 36 outputs MAC frames other than the pause frame read from the FiFo memory 22 directly to the PMA/PCS unit 28. The frame transmitted by the frame transmission unit 36 arrives at the frame processing unit 18 via the PMA/PCS unit 28.

The frame transmission unit 36 monitors the transmission state of received frames based on the state of reading from the FiFo. It a request for insertion of a pause frame (pause insertion request) is received from the quanta value conversion unit 32, the frame transmission unit 36 transmits a pause insertion instruction pulse (acknowledge signal) to the quanta value conversion unit 32 upon detecting that transmission of a pause frame is enabled.

Figure 11:
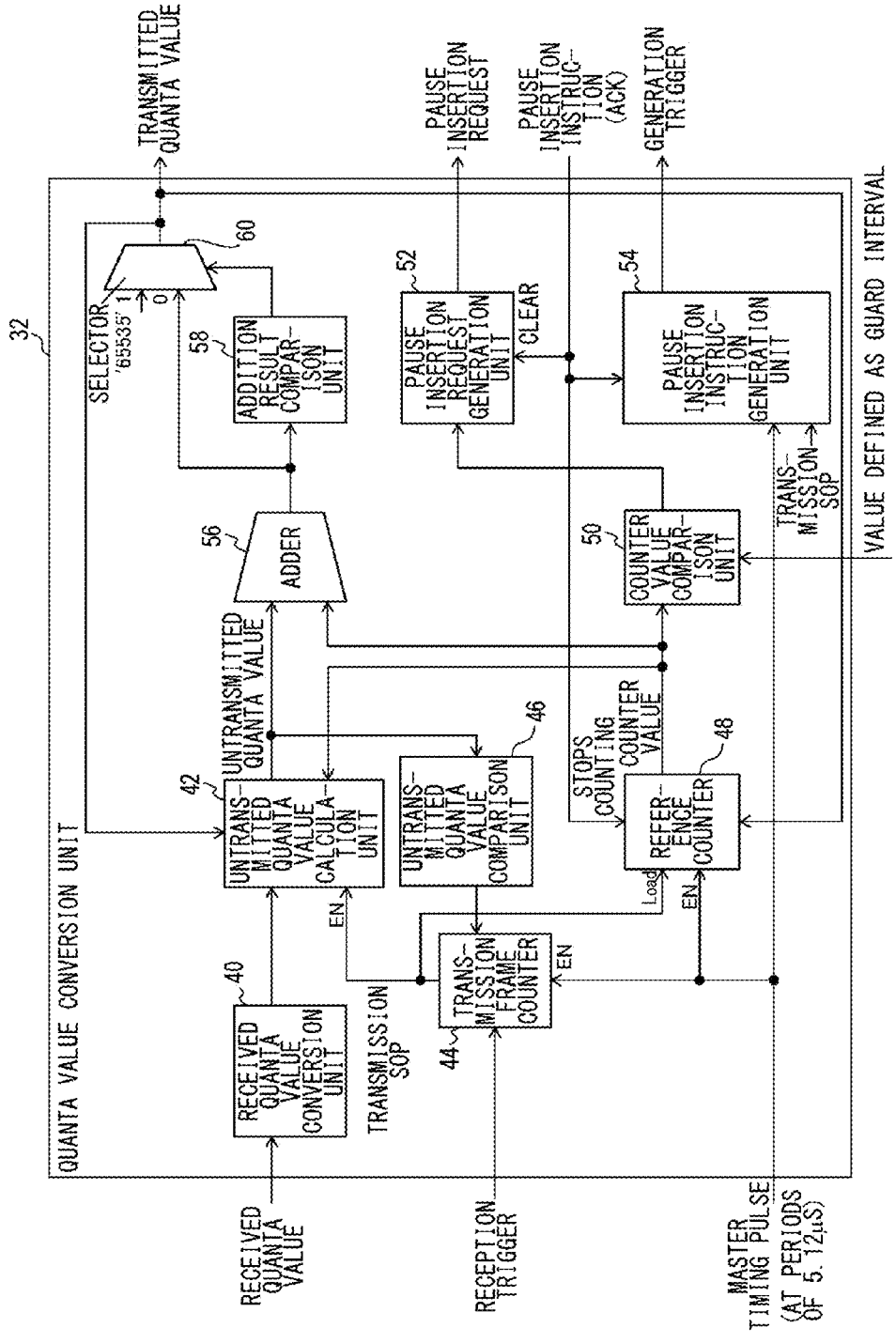
FIG. 11 shows the detailed configuration of the quanta value conversion unit of FIG. 10.

FIG. 11 shows the detailed configuration of the quanta value conversion unit 32 of FIG. 10 The quanta value conversion unit 32 includes a received quanta value conversion unit 40, an untransmitted quanta value calculation unit 42, a transmission frame counter 44, an untransmitted quanta value comparison unit 46, a reference counter 48, a counter value comparison unit 50, a pause insertion request generation unit 52, a pause insertion instruction generation unit 54, an adder 56, an addition result comparison unit 58, and a selector 60.

The received quanta value conversion unit 40 multiples the received quanta value by 10. The untransmitted quanta value calculation unit 42 stores the received quanta value multiplied by 10 as the initial value of the untransmitted quanta value. As described below, when the transmission quanta value is output, the untransmitted quanta value calculation unit 42 updates the untransmitted quanta value based on the transmission quanta value. The untransmitted quanta value is stored when the transmission SOP (Start of Packet) is "H".

Master timing pulses at periods of 5.12 µs are input to the transmission frame counter 44. Triggered by the input of a reception trigger, the transmission frame counter 44 starts counting 64 octets in synchronization with the master timing pulses at "H" (i.e., at periods of 5.12 µs) 64 octets denote the size of one pause frame, and the pulse indicating the lead position of a pause frame is the transmission SOP.

The untransmitted quanta value comparison unit 46 determines whether the untransmitted quanta value output from the untransmitted quanta value calculation unit 42 is larger than 0. If the value is larger than 0, the untransmitted quanta value comparison unit 46 feeds an instruction to transmit the next pause frame to the transmission frame counter 44. Upon receipt of an instruction to transmit a pause frame from the untransmitted quanta value comparison unit 46, the transmission frame counter 44 directs the reference counter 48 to start downcounting. The transmission frame counter 44 also directs the untransmitted quanta value calculation unit 42 to output the untransmitted quanta value to the adder 56.

The reference counter 48 stores a reference counter value for managing the guard interval. The reference counter 48 uses the transmission quanta value as the initial value of the reference counter value and downcounts (decrements) the reference counter value one by one in synchronization with the master timing at periods of 5.12 µs. In this embodiment, a downcounter is used. Alternatively, an upcounter for incrementing up to the transmission quanta value may be used.

The counter value comparison unit 50 monitors the reference counter value output from the reference counter 48. When the reference counter value reaches the predefined guard interval, the counter value comparison unit 50 determines that the guard interval in which a pause frame can be generated is entered, and directs the pause insertion request generation unit 52 to output a pause insertion request. The guard interval according to the embodiment is specified by 200 quanta. This translates into 200 counts in the reference counter and 200 master timing pulses. When the counter value comparison unit 50 detects that the reference counter value reaches "200", the counter value comparison unit 50 outputs "H" to the pause insertion request generation unit 52.

The longer the guard interval set, the lower the risk that the state of pause of transmission in the frame processing unit 18 is terminated before the requested period of time expires but the lower efficiency of transmitting pause frames. It is therefore desirable that a value that allows for the risk and efficiency is defined. That the guard interval is specified by 200 quanta means that the guard interval is 1024 µs. In a 100 Mbps environment, approximately 12500 bytes can be transferred in the guard interval. Therefore, even if a jumbo frame is being transmitted when the guard interval is entered, transmission of the next pause frame can be completed before the guard interval expires, i.e., before the state of pause of transmission induced by the previous pause frame is terminated.

When "H" is input from the counter value comparison unit 50, the pause insertion request generation unit 52 outputs a pause insertion request to the frame transmission unit 36 to request insertion of a pause frame. As described before, the frame transmission unit 36 receives the pause insertion request and returns a pause insertion instruction pulse upon determining that transmission of a pause frame is enabled. The pause insertion request generation unit 52 completes outputting the pause insertion request when the pause insertion instruction pulse is received.

Upon receipt of the pause insertion instruction pulse, the reference counter 48 stops downcounting the reference counter value and outputs the reference count value occurring at that time to the adder 56 and the untransmitted quanta value calculation unit 42. The adder 56 adds the reference count value output from the reference counter 48 to the untransmitted quanta value output from the untransmitted quanta value calculation unit 42. When the first pause frame is transmitted, i.e., when the transmission quanta value is output for the first time, the reference counter 48 has not started downcounting so that the reference counter value is not input.

The addition result comparison unit 58 determines whether the addition result is higher than the upper limit (65535) of the quanta value that can be defined in a pause frame. If the addition result is higher than 65535, the selector 60 outputs the upper limit 65535 to the pause frame regeneration unit 34, as the transmission quanta value. If the addition result is lower than 65535, the selector 60 outputs the addition result to the pause frame regeneration unit 34. The selector 60 can be said to be a multiplexer.

The transmission quanta value is input to the untransmitted quanta value calculation unit 42 and the reference counter 48. The untransmitted quanta value calculation unit 42 subtracts the transmission quanta value from the current untransmitted quanta value and adds the reference counter value output from the reference counter 48 to the untransmitted quanta value. This returns the fraction of the transmission quanta value not reflected in the pause of transmission in the frame processing unit 18 to the untransmitted quanta value. As a result, the fraction of the transmission quanta value not reflected in the pause of transmission in the frame processing unit 18 can be reflected in the quanta value of the subsequent pause frame. The reference counter 48 replaces the reference counter value by the transmission quanta value and starts downcounting the transmission quanta value.

Upon receipt of a pause insertion instruction pulse, the pause insertion instruction generation unit 54 outputs a predefined generation trigger for generating a pause frame to the pause frame regeneration unit 34. Thus, upon receiving the input of one reception trigger and one received quanta value, the quanta value conversion unit 32 outputs the transmission quanta value at least once and outputs a generation trigger at least once until the untransmitted quanta value, 10 times the received quanta value, reaches 0. This causes the pause frame regeneration unit 34 to generate at least one pause frame and causes the frame transmission unit 36 to transmit at least one pause frame to the frame processing unit 18.

Figure 12:
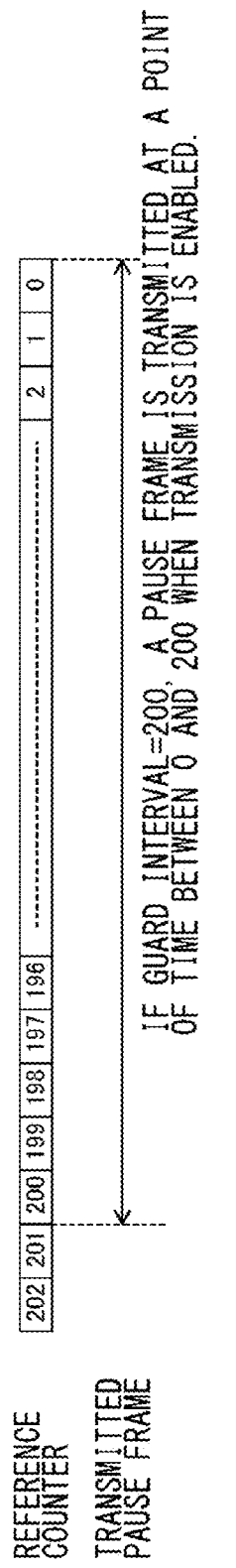
FIG. 12 shows the relationship between the guard interval and the timing of output of a pause frame.

FIG. 12 shows the relationship between the guard interval and the timing of output of a pause frame. In the case that the guard interval is defined to be 200, a pause frame is transmitted while the reference counter value downcounted by the reference counter 48 is between 200 and 0 and at a point of time when transmission is enabled due to the condition of transmission of other frames.

Figure 13:
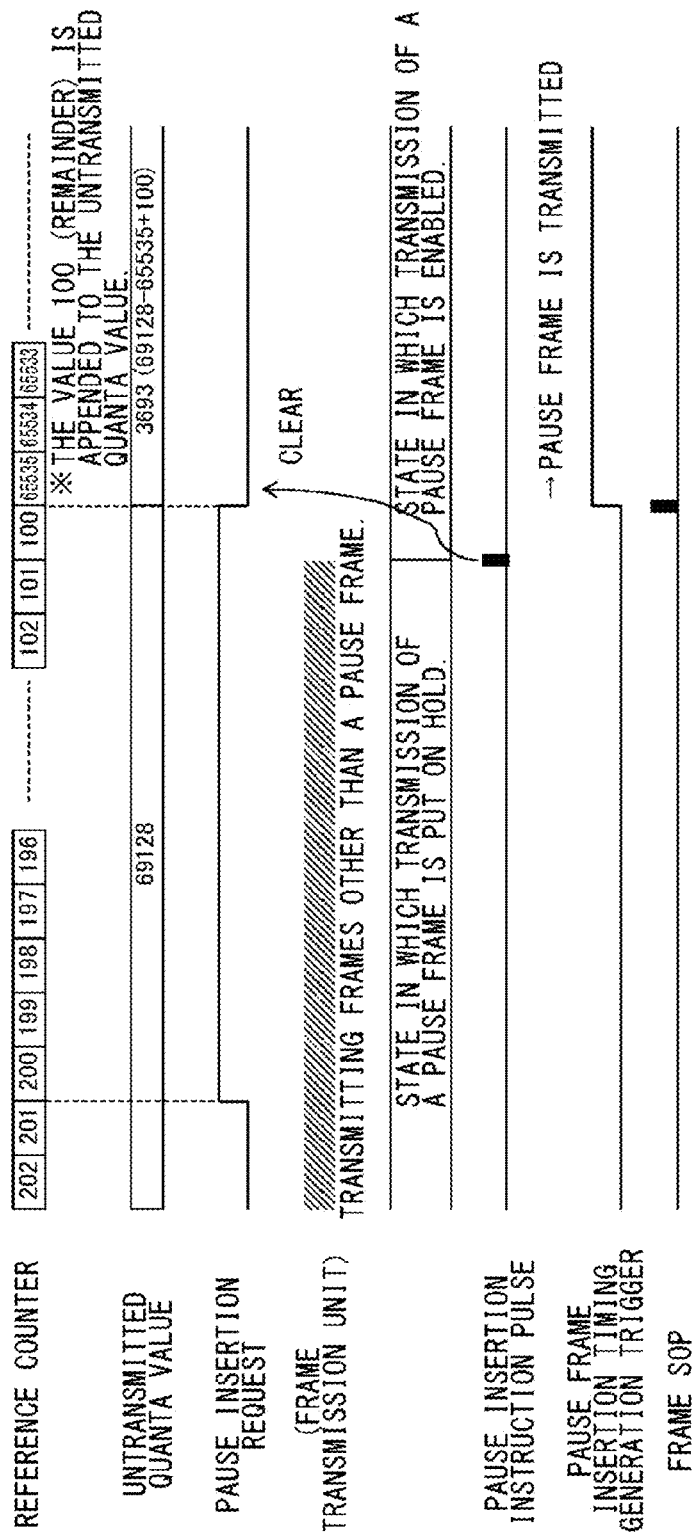
FIG. 13 shows the relationship between a pause insertion request and a pause insertion instruction pulse.

FIG. 13 shows the relationship between a pause insertion request and a pause insertion instruction pulse. The figure shows that insertion of a pause frame is enabled in a case where the guard interval is defined to be 200 and when the reference counter value reaches 100. As shown in the figure, the pause insertion request is asserted to "H" when the reference counter value reaches 200. In this case, the frame transmission unit 36 is processing transmission of a frame other than a pause frame so that transmission of a pause frame is placed in a wait state.

When transmission of a pause frame is enabled in the frame transmission unit 36, the pause insertion instruction pulse is asserted so that transmission of a pause frame is started. The reference counter value of 100 occurring when the pause insertion instruction pulse is asserted indicates that remainder from the full count, i.e., the fraction of the transmission quanta value not resulting in pause of transmission. Therefore, the remainder is appended to the untransmitted quanta value so as to define the untransmitted quanta value referred to when the next pause frame is transmitted. The pause insertion request is canceled when the pause insertion instruction pulse is received.

A description will now be given of the operation according to the configuration described above. The client device is provided with an interface for 10 Mbps communication but is not compatible with 100 Mbps communication. The frame processing unit 18 of the transmission device 10 built by the general-purpose device is provided with an interface for 100 Mbps communication but is not compatible with 10 Mbps communication. MAC frames are transmitted and received between the client device and the transmission device 10. The data rate conversion unit 16 of the transmission device 10 performs a rate conversion process.

When the client device detects a memory full state within the device, the client device transmits a pause frame designating a predefined quanta value to the transmission device 10. Upon detecting the pause frame transmitted from the client device, the pause frame conversion unit 26 of the data rate conversion unit 16 generates as many pause frames as determined by the quanta value of the pause frame. The frame processing unit 18 pauses transmission of MAC frame destined to the client device for a period of time determined by the quanta values of at least one pause frames output from the pause frame conversion unit 26.

Figure 14:
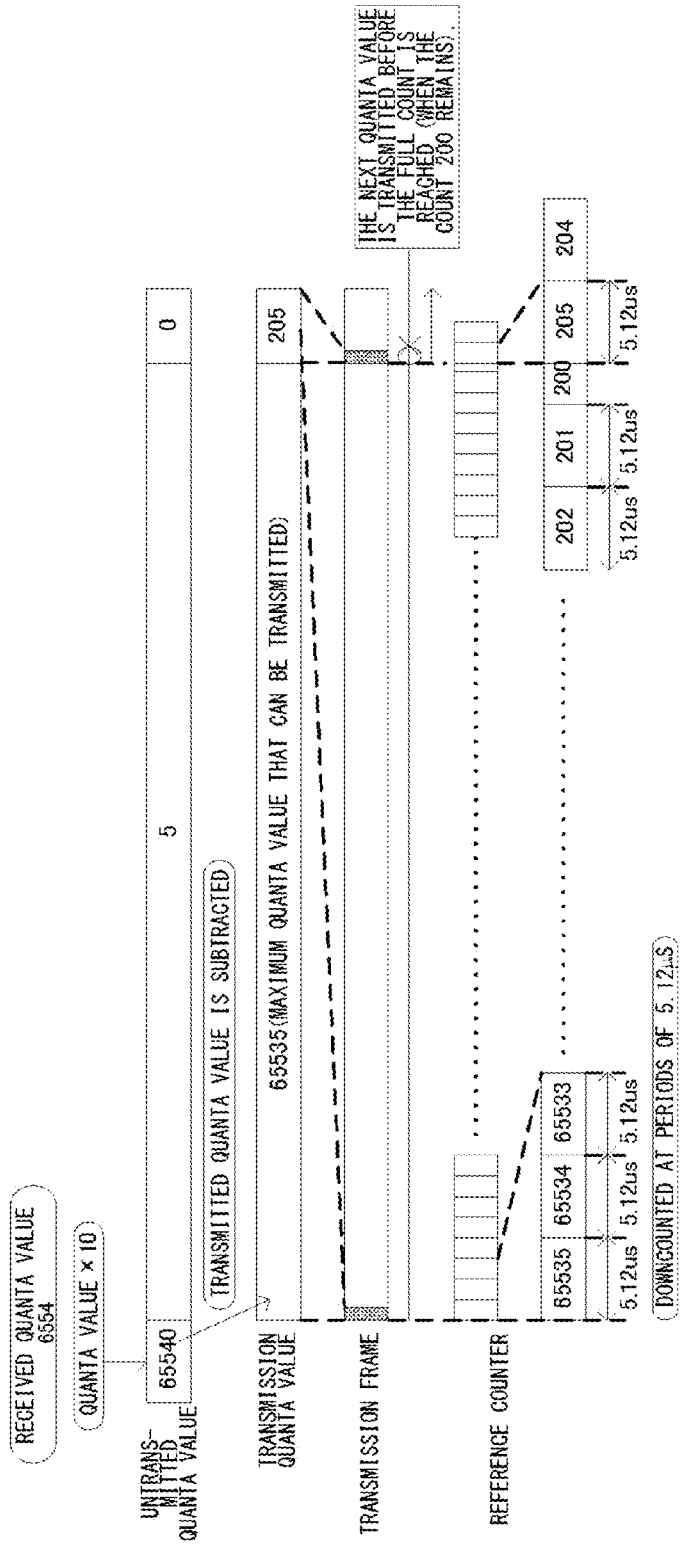
FIG. 14 schematically shows the operation of pause frame conversion.

FIG. 14 schematically shows the operation of pause frame conversion. The figure shows a case in which the received quanta value is 6554 and the guard interval is defined to be 200. After the first pause frame (transmission quanta value=65535) is transmitted, the reference counter downcounts the initial value 65535 at intervals of 5.12 μs, the duration of one quanta. When the reference counter value reaches 200, which occurs before the full count, the second pause frame is transmitted. The second pause frame is transmitted when the reference counter value is 200. Therefore, the remaining pause time is 200. Accordingly, the total of the untransmitted quanta value 5 and the remaining pause time 200 (=205) is defined as the transmission quanta value of the second pause frame. When the untransmitted quanta value reaches 0 as a result of the transmission of the second pause frame, the process of pause frame conversion is terminated.

Figure 15:
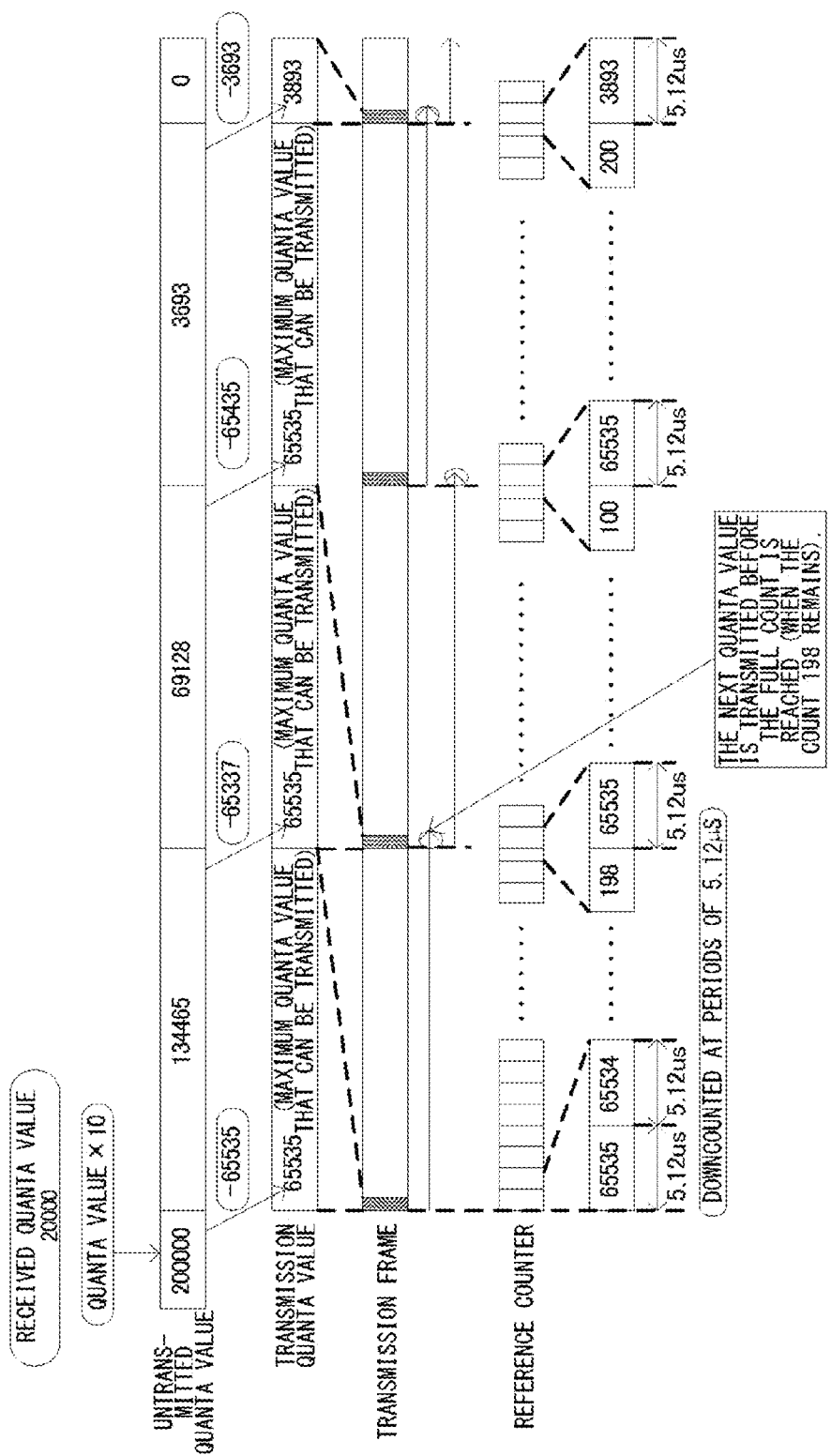
FIG. 15 schematically shows the operation of pause frame conversion.

FIG. 15 also shows the operation of pause frame conversion schematically. The figure shows an example in which the received quanta value is 20000 and the guard interval is defined to be 200. In this example, the upper limit of quanta value 65535 is defined as the transmission quanta value of the first through third frames. When the first frame is transmitted, the reference counter is not in operation. Therefore, the untransmitted quanta value after the transmission of the first frame is 134465 (200000−65535). The second frame is transmitted when the reference counter value is 198. Therefore, the untransmitted quanta value after the transmission of the second frame is 69128 (=134465−65535+198).

The third frame is transmitted when the reference counter value is 100. Therefore, the untransmitted quanta value after the transmission of the third frame is 3693 (=69128−65535+ 100). The fourth frame is transmitted when the reference counter value is 200. Therefore, the untransmitted quanta value of the fourth frame is defined to be 3893 (=3693+200). When the untransmitted quanta value reaches 0 as a result of the transmission of the fourth pause frame, the process of pause frame conversion is terminated.

Described above is an explanation based on an exemplary embodiment. The embodiment is intended to be illustrative only and it will be obvious to those skilled in the art that various modifications to constituting elements and processes could be developed and that such modifications are also within the scope of the present invention.

In the embodiment described above, the transmission quanta value is determined by using the upper limit of quanta value that can be defined in a pause frame as a reference. In a variation, a quanta value designated by the client device may be used as a reference to determine the transmission quanta value. According to the variation, the same advantage as described above in the embodiment is achieved. The processing flow according to the variation will be as described below.

(1) The received quanta value is used as the transmission quanta value.

(2) A pause frame in which the above transmission quanta value is defined is transmitted a certain number of times determined by the rate difference between the client device and the general-purpose device in the transmission device. If the client device is only compatible with 10 Mbps low-speed communication and the general-purpose device is compatible with 100 Mbps communication but is not compatible with 10 Mbps, the pause frame is transmitted 10 times.

(3) An adjustment pause frame for compensation of remaining pause time is transmitted once.

In the following description with reference to FIGS. 16 and 17, it is also assumed that the client device is only compatible with 10 Mbps and the general-purpose device is compatible with 100 Mbps communication but is not compatible with 10 Mbps.

Figure 16:
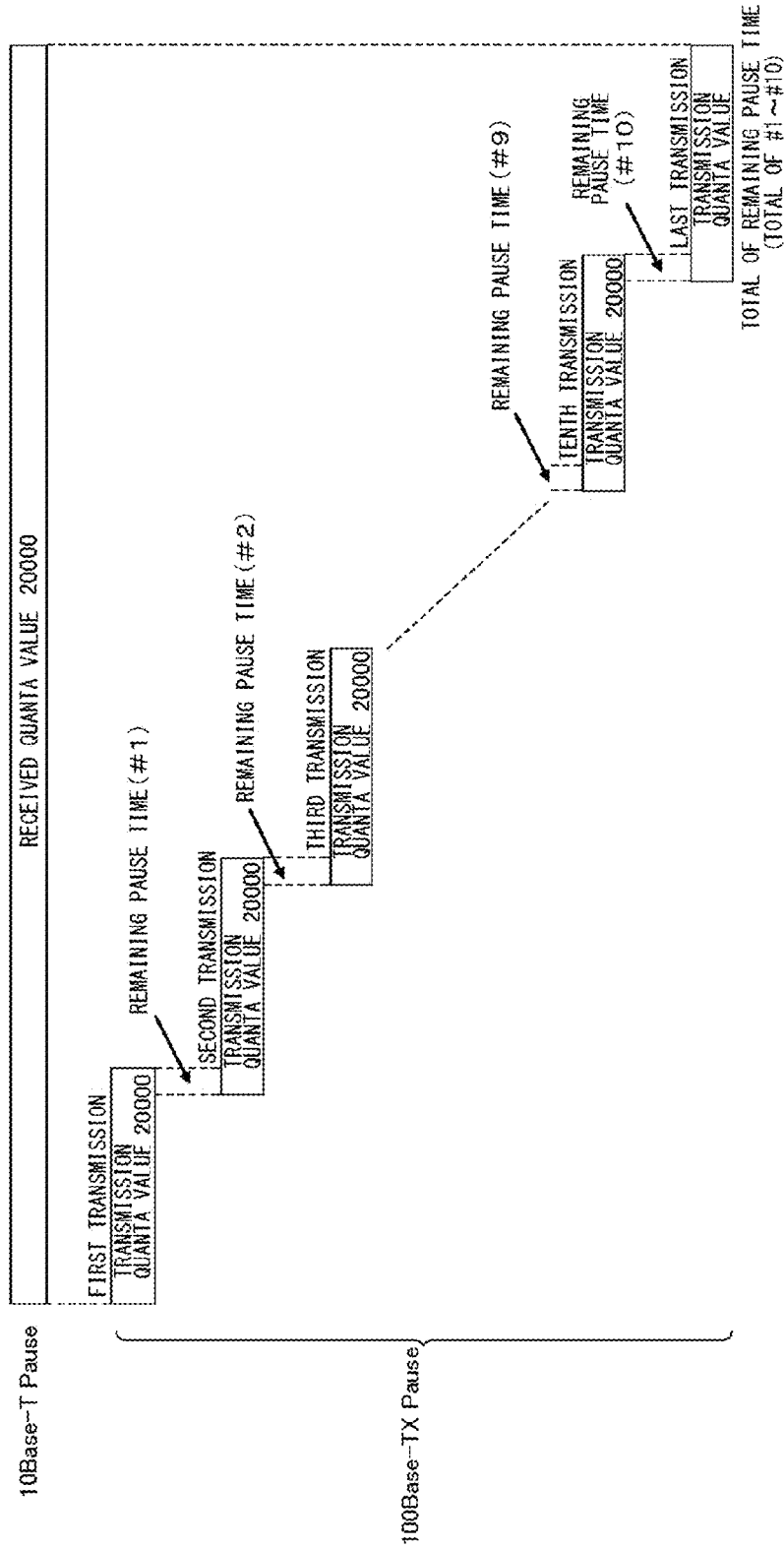
FIG. 16 shows the principle of pause frame conversion according to the variation.

FIG. 16 shows the principle of pause frame conversion according to the variation. As shown in FIG. 16, the received quanta value 20000 is defined as the transmission quanta value of the first through tenth pause frames transmitted. The total of the remaining pause time from the ten pause frames is defined as the transmission quanta value of the eleventh pause frame transmitted.

The configuration of the transmission device implementing the pause frame conversion according to the variation is similar to that of FIGS. 9 and 10. The difference is that the quanta value conversion unit 32 of the pause frame conversion unit 26 does not need to store an untransmitted quanta value. Instead, the quanta value conversion unit 32 stores the number of times that pause frames are transmitted, i.e., the number of times that the transmitted quanta values are output to the pause frame regeneration unit 34. Pause frame are transmitted a certain number of times determined by the rate ratio between the client device and the frame processing unit 18 (general-purpose device). As shown in FIG. 16, if the rate ratio is 1:10, the pause frame in which the received quanta value is defined directly is transmitted 10 times. In other words, the transmission quanta value equal to the received quanta value is output to the pause frame regeneration unit 34 ten times.

The idea behind the guard interval is the same as that of the embodiment. The quanta value conversion unit 32 stores the remaining pause time occurring as the second and subsequent pause frames are transmitted. The quanta value conversion unit 32 defines the total of remaining pause time as the transmission quanta value of the last pause frame. In the example of FIG. 16, the transmission quanta value output to the pause frame regeneration unit 34 for the eleventh time is defined to be the total of the remaining pause time.

Figure 17:
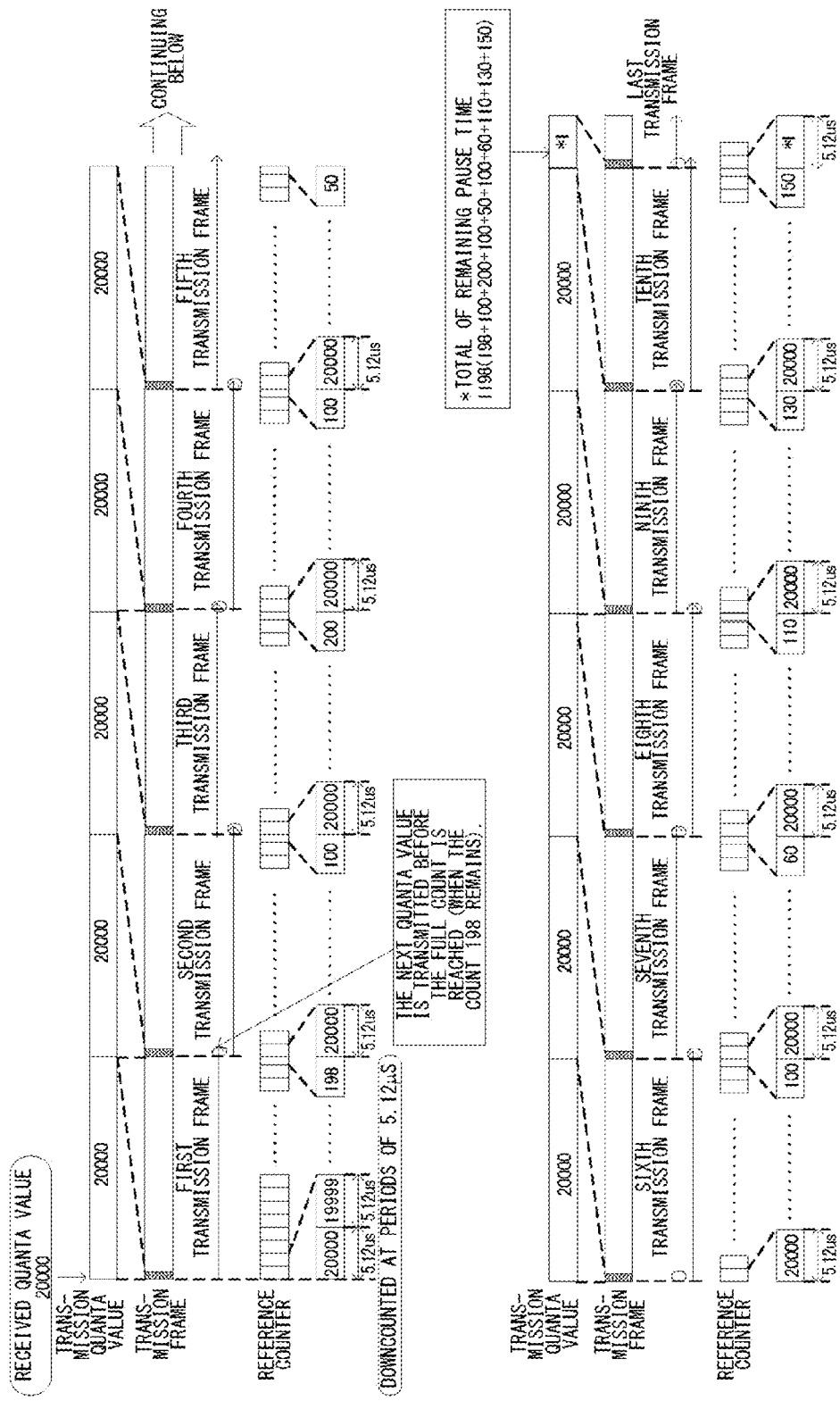
FIG. 17 schematically shows the operation of pause frame conversion according to the variation.

FIG. 17 schematically shows the operation of pause frame conversion according to the variation. The figure shows an example in which the received quanta value is 20000 and the guard interval is defined to be 200. The received quanta value 20000 is defined in the first through tenth pause frames. The total of remaining pause time 1198 occurring as the second and subsequent pause frames are transmitted is defined in the eleventh and last pause frame.

In the example assumed in the embodiment and the variation described above, the client device is only compatible with 10 Mbps low-speed communication and the general-purpose device is compatible with 100 Mbps communication but is not compatible with 10 Mbps communication. The technical idea of the embodiment and the variation is not bounded by the example. In other words, the technical idea can be widely applied to cases where a pause frame transmitted from the client device compatible with a relatively low communication rate is routed to the frame processing unit (general-purpose device) compatible with a relatively high communication rate.

For example, the technical idea can be applied to cases where the client device is compatible with 100 Mbps communication but is not compatible with 1 Gbps communication, and the frame processing unit is compatible with 1 Gbps communication but is not compatible with 100 Mbps. In this case, the value obtained by multiplying the received quanta value by 10 may be transferred to the frame processing unit by using a plurality of pause frames, as in the embodiment and the variation. The technical idea can also be applied to cases where the client device is only compatible with 10 Mbps and the transmission device is only compatible with 1 Gbps communication. In this case, the value obtained by multiplying the received quanta value by 100 may be transferred to the frame processing unit by using a plurality of pause frames.

It will be understood to a skilled person that the functions achieved by the constituting elements recited in the claims are implemented either alone or in combination by the constituting elements shown in the embodiment and the variation.

What is claimed is:

1. A transmission device comprising:
  an interface unit connected to a client device compatible with a relatively low communication rate;
  a frame processing unit that is compatible with a relatively high communication rate and processes a frame transmitted from the client device; and
  a routing unit that routes a frame between the interface unit and the frame processing unit, wherein
  the interface unit receives a pause frame received from the client device, the pause frame including a first quanta value representing a pause interval in the relatively low communication rate,
  the routing unit generates one or a plurality of pause frames in accordance with a pause time designated by one pause frame received by the interface unit, the one or plurality of pause frames corresponding to a second quanta value, the second quanta value being obtained by converting the first quanta value according to a difference between the relatively low communication rate and the relatively high communication rate, and transmits the one or plurality of generated pause frames to the frame processing unit, and the frame processing unit stops transmitting frames to the client device in accordance with the one or plurality of pause frames transmitted from the routing unit.

2. The transmission device according to claim 1, wherein after transmitting a first pause frame generated in accordance with the received one pause frame to the frame processing unit, the routing unit starts a process of transmitting a second pause frame generated in accordance with the received one pause frame to the frame processing unit at a point of time before the pause time designated by the first pause frame expires.

3. The transmission device according to claim 2, wherein the routing unit reflects a fraction of the pause time designated by the first pause frame that remains when the second pause frame is transmitted, in the pause time of at least one of a plurality of pause frames generated in accordance with the received one pause frame.

4. A pause frame conversion method from a relatively low communication rate to a relatively high communication rate comprising:

acquiring a pause frame transmitted from a client device compatible with the relatively low communication rate, the pause frame including a first quanta value representing a pause interval in the relatively low communication rate;

generating one or a plurality of pause frames in accordance with a pause time designated by one pause frame transmitted from the client device, the one or plurality of pause frames corresponding to a second quanta value, the second quanta value being obtained by converting the first quanta value according to a difference between the relatively low communication rate and the relatively high communication rate; and transmitting the one or plurality of pause frames to a frame processing unit that is compatible with the relatively high communication rate and that processes a frame transmitted from the client device, thereby causing the frame processing unit to stop transmitting a frame to the client device in accordance with the one or plurality of pause frames.

\* \* \* \* \*